350-360
5/2/78 XR 4,087,810 SR

United States Patent [19]
Hung et al.
[11] 4,087,810
[45] May 2, 1978

[54] MEMBRANE DEFORMOGRAPHIC DISPLAY, AND METHOD OF MAKING

[75] Inventors: Roland Yen-Mou Hung; James Lewis Levine, both of Yorktown Heights, N.Y.

[73] Assignee: International Business Machines Corporation, Armonk, N.Y.

[21] Appl. No.: 701,436

[22] Filed: Jun. 30, 1976

[51] Int. Cl.[2] .......... G06K 15/18

[52] U.S. Cl. .......... 340/324 M; 340/373; 340/378 B; 350/360

[58] Field of Search .......... 340/324 M, 366 R, 366 B, 340/378 R, 373, 378 B; 350/160 R, 161 R, 161 S, 161 P; 178/15, 30; 357/45

[56] References Cited

U.S. PATENT DOCUMENTS

| | | | |
|---|---|---|---|
| 3,323,241 | 6/1967 | Blair et al. | 357/45 |
| 3,698,012 | 10/1972 | Ensminger et al. | 178/30 |
| 3,798,620 | 3/1974 | Cosentino | 350/161 S |
| 3,979,758 | 9/1976 | Kilby et al. | 178/30 |

*Primary Examiner*—David L. Trafton
*Attorney, Agent, or Firm*—Jack M. Arnold

[57] ABSTRACT

A deformographic membrane display system in which a semiconductor substrate, for example silicon, has an insulating layer such as $SiO_2$ formed thereon with an array of holes formed in the insulating layer. Alternatively, the insulating layer may be omitted, with the holes being formed in the substrate. A reflective membrane, including a thin metal layer, is formed over the surface in which the holes are formed. Electrodes are formed in the silicon substrate directly beneath or in each of the holes. Control circuitry, which for example, may be formed utilizing metal oxide semiconductor field effect transistor (MOSFET) technology and/or bipolar technology, is formed in the silicon substrate for selectively energizing the electrodes. The portion of the membrane over a given hole is deformed in response to the electrode thereunder being energized by the control circuitry.

2 Claims, 13 Drawing Figures

FIG. 5
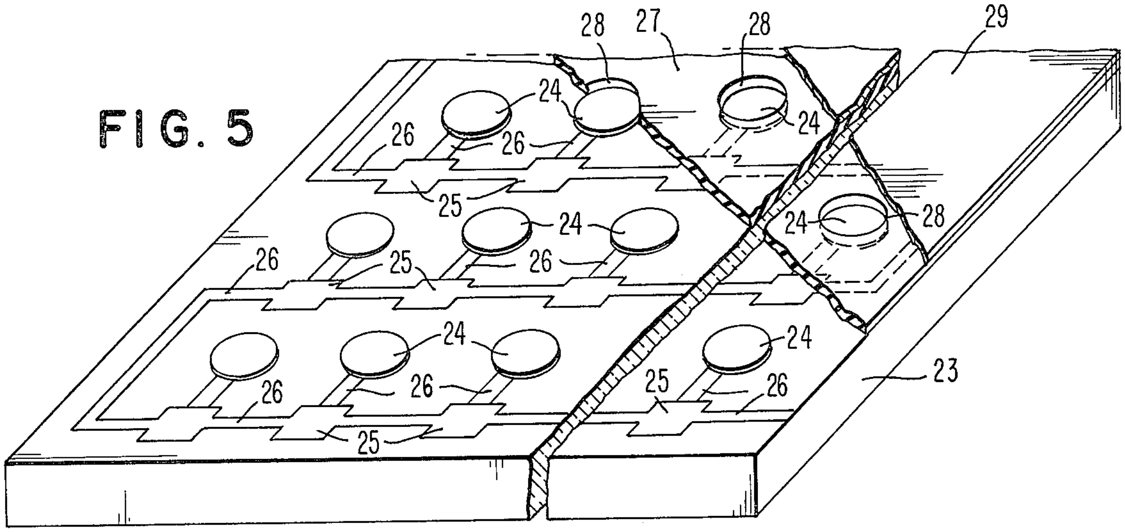
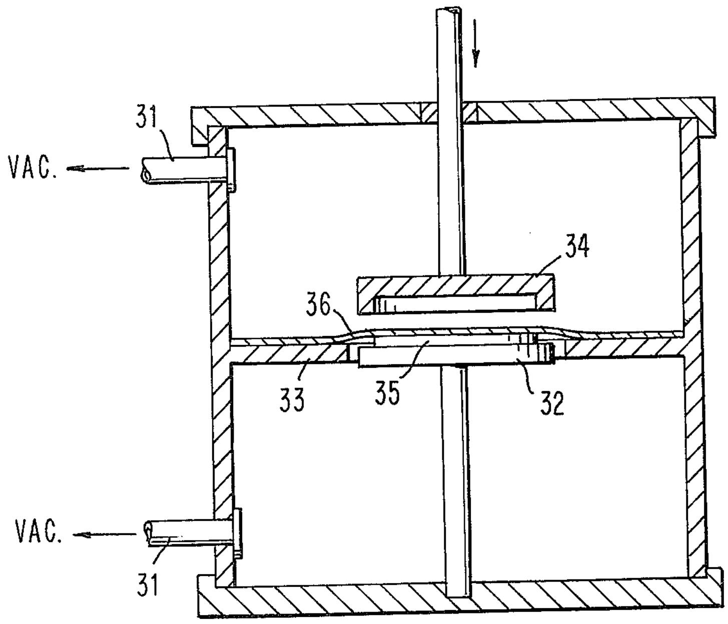
FIG. 6

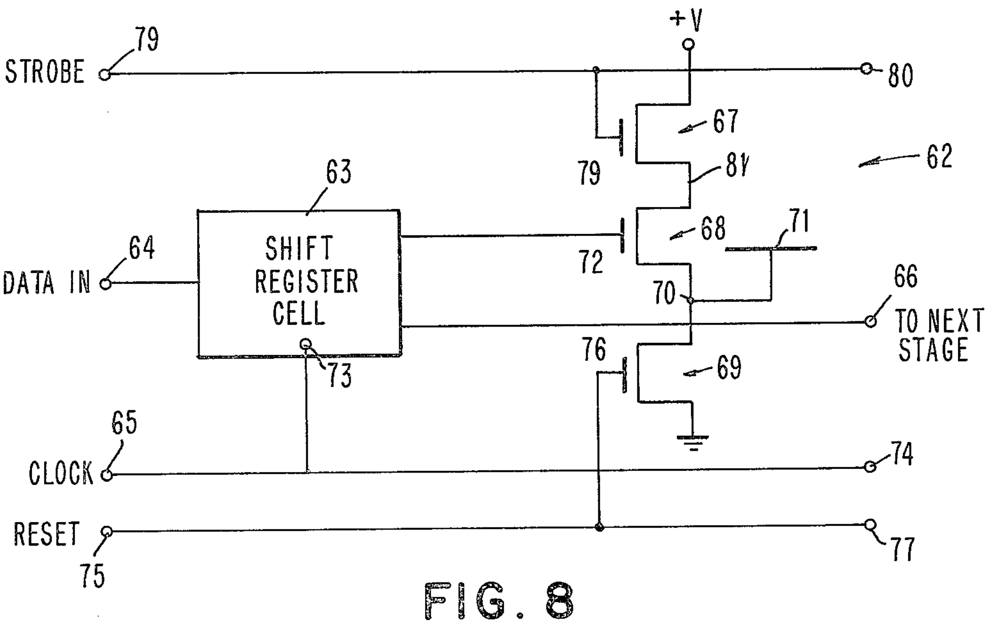
FIG. 8
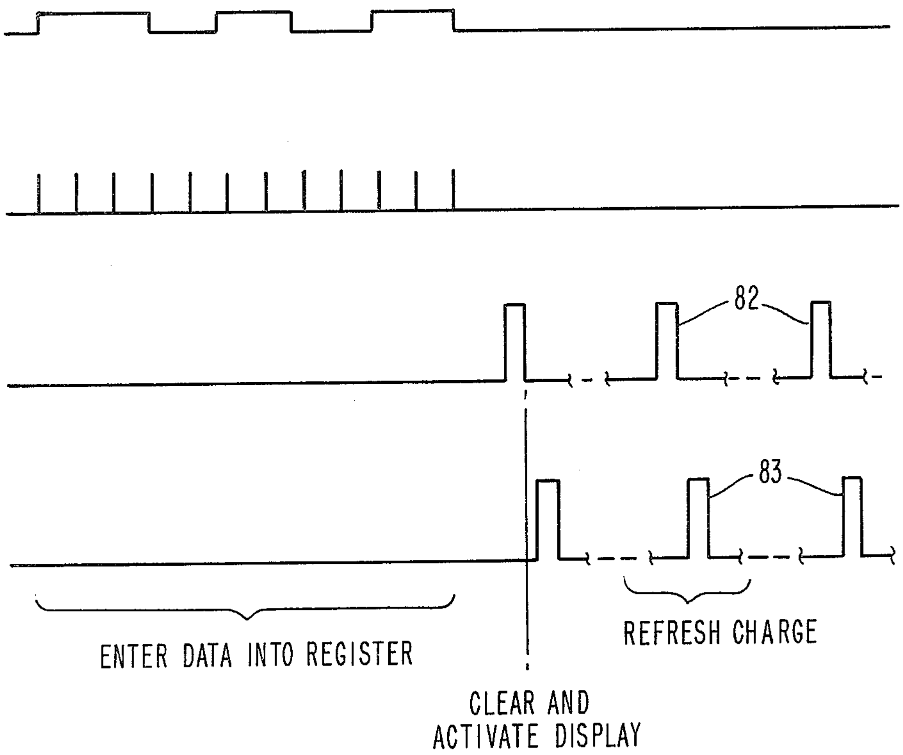
FIG. 9A
FIG. 9B
FIG. 9C
FIG. 9D

MEMBRANE DEFORMOGRAPHIC DISPLAY, AND METHOD OF MAKING

BACKGROUND OF THE INVENTION

The present invention is directed to light modulators, and in particular to light modulators known as deformographic displays. Generally, in this type of display a non-conductive base member has a plurality of symmetrically arranged holes formed therein. In some instances the holes extend partially through the base member, whereas in other instances the holes extend completely through the base member. A reflective membrane is then stretched over the surface of the base member. Provision is made to collect charge in the respective holes by electrostatic, electromagnetic or other means. The portion of the membrane over a hole in which charge has been collected is deformed or deflected in the hole. This results in the selective formation of dimples in the membrane. Light impinging on the dimpled surface is phase modulated in accordance with the depths of the dimples. Therefore, an image can be reproduced in a phase modulated form of the reflected light from the dimpled surface in accordance with which holes have charge therein.

In any event, the display structure is relatively difficult to fabricate and complex control circuitry which is housed external to the base member, is needed. In the type of base member where the holes extend partially therethrough, a plurality of external connections are required to deposit charge in the holes. In the type of base member where the holes extend completely therethrough, other means, for example an electron gun, is needed to deposit charge in the holes or on the membrane. Other known base members need to be housed in evacuated glass envelopes or the like, which increases cost and fabrication problems.

U.S. Pat. No. 3,796,480 to Preston, Jr., et al discloses a membrane light modulator wherein a collodian membrane coated with a pluality of spaced-apart, reflective and conductive strips is stretched across a support member comprised of a glass plate having an array of holes formed therein. A separate electrode is located underneath each column of holes. Individual electrical signals are applied from an external source to each of the strips and each of the electrodes to produce electrostatic deflections in the portions of the membrane over the holes. The structure itself appears difficult to fabricate and requires an external connection to each strip and to each electrode.

U.S. Pat. No. 3,701,586 to Goetz discloses a deformographic display in which a membrane is formed over a base member comprised of a microchannel plate which has the holes extending completely therethrough. Charge is placed on the membrane over a given hole by means of an electron gun. Accordingly, a complex and what appears to be difficult to fabricate display device results.

Other known deformographic displays include U.S. Pat. No. 3,858,080 to Wohl which discloses a deformographic storage display device, and U.S. Pat. No. 3,479,109 to K. Preston, Jr., which discloses a display in which a membrane is stretched over a glass base member.

According to the present invention, a deformographic display is disclosed in which the base member is a semiconductor, rather than a non-conductor, and in which the control circuitry can be fabricated directly in the semiconductor substrate using MOSFET and/or bipolar technology. Accordingly, the external control connections are reduced to a minimum resulting in a more efficient and easily fabricated display.

SUMMARY OF THE INVENTION

According to the present invention, a deformographic display is disclosed. A semiconductor substrate has a plurality of holes formed in one surface thereof, or alternatively an insulating layer is formed on the one surface of the semiconductor substrate, with the holes being formed in the insulating layer instead of the substrate. A membrane is formed over the surface in which the holes are formed. A plurality of control electrodes are formed in the substrate under or in the holes, with one such electrode per hole. The portion of the membrane over a given hole is deformed in response to the electrode thereunder being energized by control circuitry.

DETAILED DESCRIPTION OF THE DRAWINGS

FIG. 5 is a schematic diagram representation illustrating another method of forming a deformographic membrane display on a semiconductor substrate;

FIG. 6 is a sectional view of a vacuum chamber illustrating how a membrane is hermetically sealed on a semiconductor substrate for fabricating a deformographic membrane display;

FIG. 8 is a schematic diagram representation of a typical shift register stage which may be utilized in the shift register illustrated in FIGS. 7A and 7B; and FIGS. 9A–9D are waveform relationship diagrams illustrating how data is applied in a timed sequence to respective shift register stages as illustrated in FIG. 8.

DETAILED DESCRIPTION OF THE INVENTION

A deformographic display according to the present invention includes a reflective metallized membrane stretched over an insulating layer, such as silicon dioxide, which is formed on top of a silicon wafer. The wafer in one embodiment includes circuitry buried under the layer of insulation. The insulating layer has holes formed therein to allow the membrane to deform under the attraction of a charged metal electrode which is formed in the bottom of each hole. The charge on a given electrode is controlled by the circuitry. In another embodiment, holes are etched directly in the silicon wafer.

Figure 1:
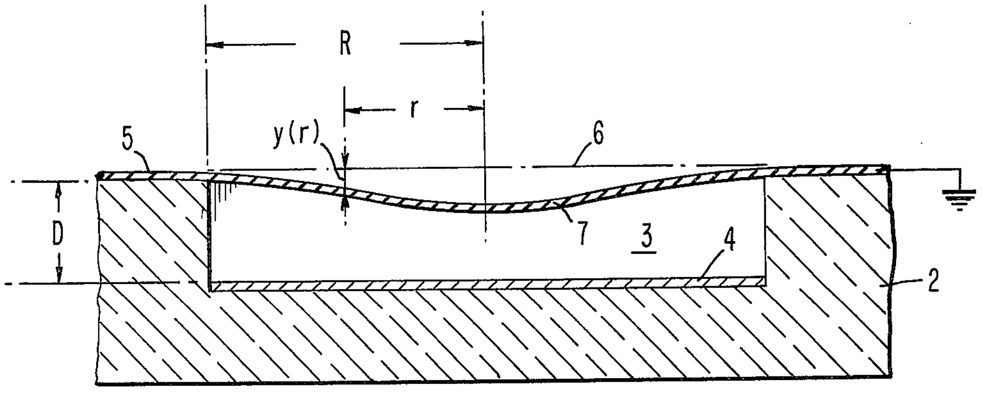
FIG. 1 is a cross-sectional view of a portion of a deformographic membrane display.

FIG. 1 illustrates a substrate 2 which has a hole 3 formed therein. A metal electrode 4 is formed in the bottom of the hole, and a reflective metallized membrane 5 is stretched over the top surface of the substrate 2. Dashed line 6 illustrates the position of the membrane in the undeformed state, whereas the solid line 7 illustrates the position of the membrane in the deformed state. R is the radius of the hole in the substrate, and r is the radius of a symmetrically circular deformation of the membrane with respect to the center of the hole. Y(r) describes the circular symmetric deformation of the membrane. How the deformographic display is fabricated is described shortly.

Figure 2:
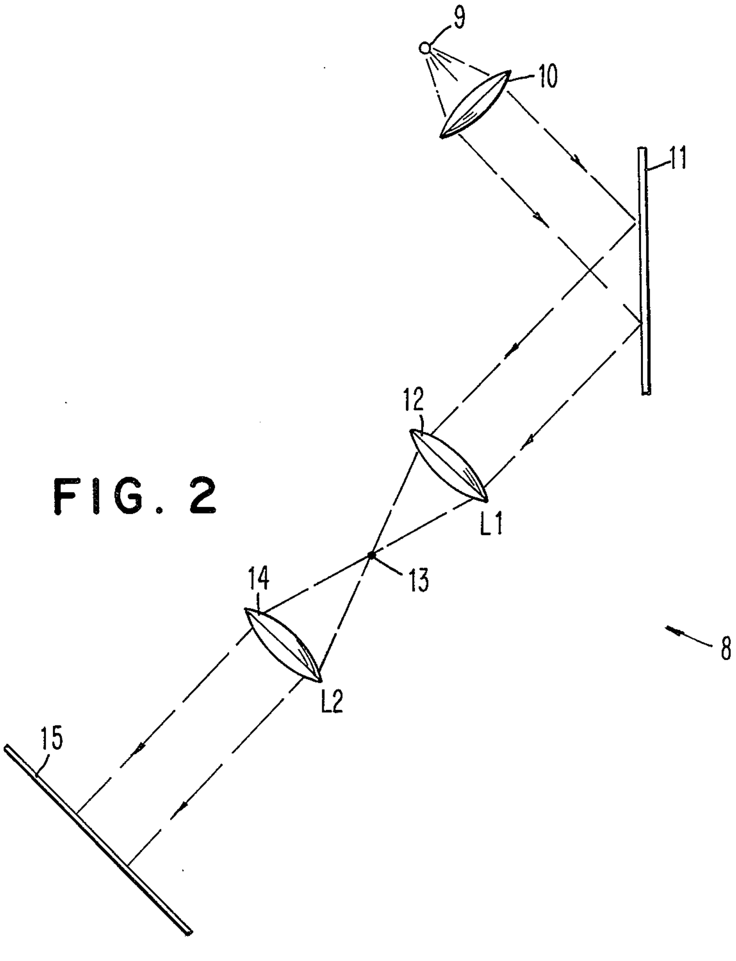
FIG. 2 is a dark field projection system which may be utilized in the practice of the present invention.

FIG. 2 illustrtes generally at 8 a dark field projection system. A light source 9 projects light to a lens 10 which directs collimated light to a membrane 11 which reflects the light, which light is then focused by a lens 12 onto a stop 13. A lens 14 collects light which bypasses the stop, and projects the light onto a screen 15. The lens 14 is adjusted to image the membrane onto the screen 15. The stop 13 is designed to block all light when the membrane is undeformed, including light which is scattered from any surface structure created by the underlying circuitry in the substrate.

Each deformed spot results in a bright spot on the screen of intensity:

$$S = \frac{4\,S_o}{R^2} \int_o^R \frac{rdr}{R^2}\,(1 - \cos\phi) \qquad (1)$$

where:

$S_o$ = intensity on the screen with the stop removed;

$R$ = radius of hole in the substrate;

$$\phi = \frac{4\pi\, y(r)}{\lambda R};$$

λ = the wavelength; and

Y(r) = describes the circularly symmetric deformation of the membrane at a distance r from the center of the hole.

Figure 3:
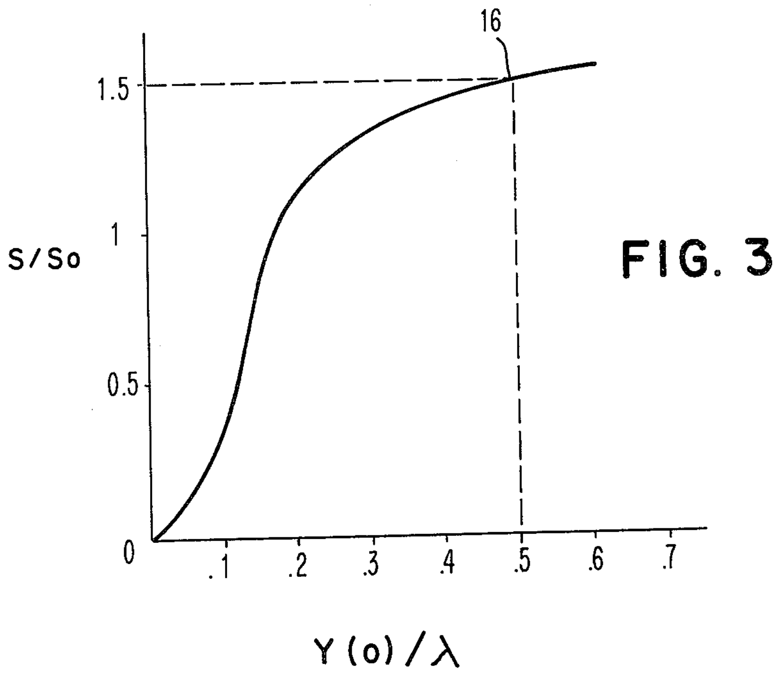
FIG. 3 is a curve plotting spot brightness versus deflection in a membrane deformographic display.

The locations of spots on the screen 15 correspond to the location of the deformations on the membrane 11, apart from magnification provided by the lens 14. The degree of collimation, lens properties, depth of deformation, etc. under which equation (1) is valid is well-known to those skilled in the arts of phase-contrast microscopy. FIG. 3 illustrates a typical curve of spot brightness ($S/S_o$) versus deflection (Y(o)), indicating at 16 that a deflection Y(o) of about ½ the wavelength of the light is sufficient for display purposes.

Figure 4:
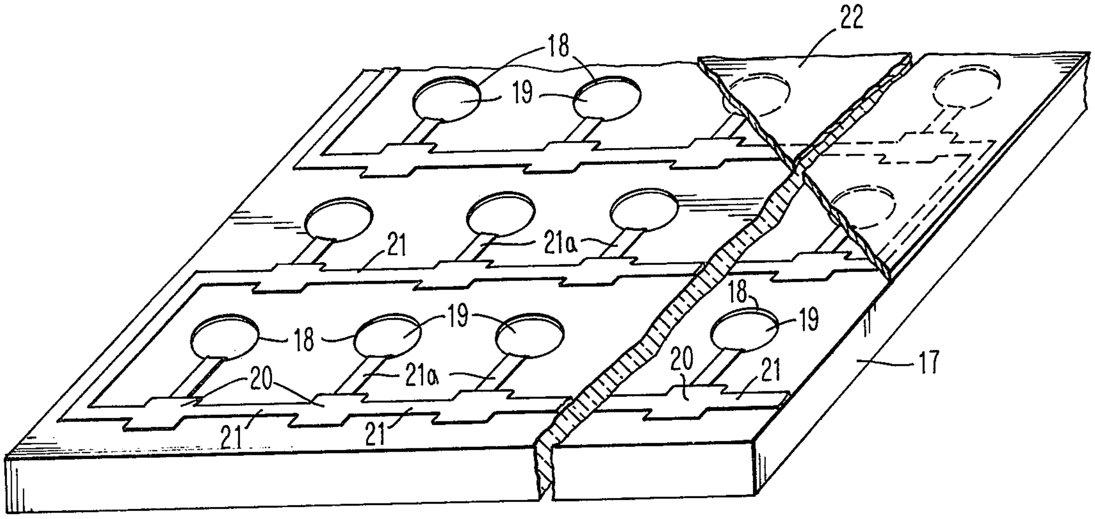
FIG. 4 is a schematic diagram representation illustrating one method of forming a deformographic membrane display on a semiconductor substrate.

Refer now to FIG. 4 which illustrates an exemplary process for fabricating a deformographic membrane display according to the present invention. A semiconductor substrate 17, having a diameter in the range of one to four inches and a thickness on the order of ten mils has a plurality of holes 18 formed therein. The semiconductor substrate is preferably silicon, but may also be comprised of gallium arsenide or any other suitable semiconductor material. The holes are formed to a depth of a few microns, for example, by standard semiconductor etching processes, ion-beam drilling or other known techniques. The holes 18 then have metal electrodes 19 formed therein by vapor deposition of a metal such as aluminum, or any other suitable means of depositing a metal to a thickness of a few hundred Angstrom (A) in the hole. Control circuitry 20 is fabricated on the semiconductor substrate 17 utilizing standard silicon planar processes for large scale integrated circuitry implementation. For example, metal oxide semiconductor field effect transistor (MOSFET) processes may be utilized. Typical control circuits include: shift register cells and other standard MOS circuitry. A typical control circuit is illustrated in detail in FIG. 8. The individual control circuits are interconnected by a pluality of lines 21, which, for example, may include data input lines, clock lines, strobe lines and reset lines. Lines **21*a* interconnect individual control circuits to selected electrodes. These lines may be formed utilizing standard photolithographic techniques. A reflective metallized membrane 22 is then stretched, preferably metal side down, under a reduced pressure, as described in more detail in relation to FIG. 6, over the surface of the substrate. The membrane must be highly relfective, and able to deform under the forces provided by low voltage (say 5–20 volt) circuitry. It may consist of a thin layer, typically 800**A, of plastic (e.g., collodion) which acts as a support for an evaporated layer of metal. The plastic is not essential, and may be recovered either before or after mounting. The metal should be thick enough to reflect most of the incident light, but sufficiently thin to be easily deformable. A good reflector such as aluminum or silver is suitable. Also, the metal should not be susceptible to flexural fatigue. If the plastic layer is used, the metal layer should be on the order of 400A thick, whereas if the plastic layer is omitted, the metal layer should be on the order of 600A thick.

The deformation is resisted by 3 factors. (1) If gas is trapped under the membrane, it will be compressed, thus resisting the deformation. (2) If the membrane is mounted under tension, there will be a restoring force similar to that provided by a stretched wire against lateral deflection. (3) Finally, there is the flexural rigidity of the membrane itself. Only the latter is intrinsic, the others may be eliminated by proper fabrication procedures.

FIG. 5 illustrates another exemplary process for forming a deformographic membrane display on a semiconductor substrate. A semiconductor substrate 23 having a diameter in the range of one to four inches and a thickness on the order of ten mils, has a plurality of electrodes 24 formed on selected areas of the surface thereof by evaporation of a thin metal layer. Again, the semiconductor substrate is preferably silicon, but also may be comprised of gallium arsenide or any other suitable semiconductor material. Control circuitry 25, which may be formed, for example, utilizing MOSFET technology, is fabricated on the substrate 23 with control lines 26 being formed utilizing photolithographic techniques or the like. An insulating layer 27, for example $SiO_2$, is formed to a thickness of the order of one to two microns over the surface of the semiconductor 23.

A plurality of holes 28 are then etched in the layer 27 directly above each of the electrodes 24. A metallized membrane 29 is stretched under reduced pressure over the insulating layer 21 and is hermetically sealed thereto. A typical arrangement for hermetically sealing the metallized membrane 29 to the layer 27 is illustrated in FIG. 6.

FIG. 6 illustrates an exemplary technique for hermetically sealing the metallized membrane to the semiconductor substrate whether or not an insulating layer is formed on the substrate. A vacuum chamber 30 includes ducts 31 which are connected to pumps (not shown) which evacuate the chamber 30. The chamber 30 also includes a packaging base 32, a temporary support 33, and a lid 34 which is used to press the membrane onto the silicon substrate. A silicon substrate 35 is mounted on the base 32, and a metallized membrane 36 is temporarily mounted on the support 33. After evacuating both the upper and lower halves of chamber 30, the membrane 36 is forced into contact with the silicon substrate 35 by manipulating the pressure in the upper half of chamber 30. The lid 34 is then depressed against the membrane and hermetically sealed by means of a suitable adhesive material or by soldering.

Figure 7A:
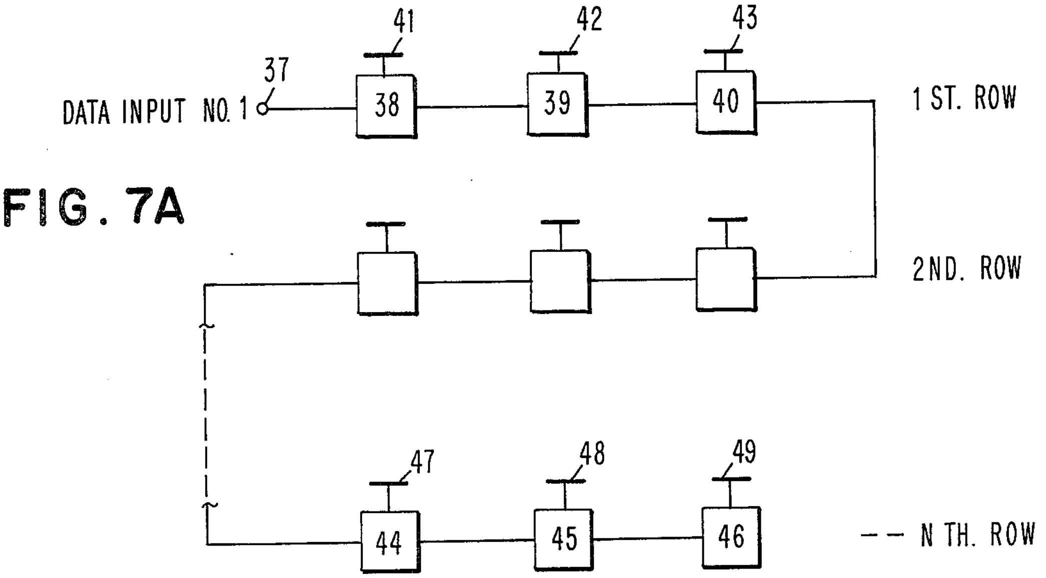
FIGS. 7A and 7B are schematic diagram representations of a serial shift register configuration which may be used for selectively applying charge to the respective electrodes in a deformographic membrane display.
Figure 7B:
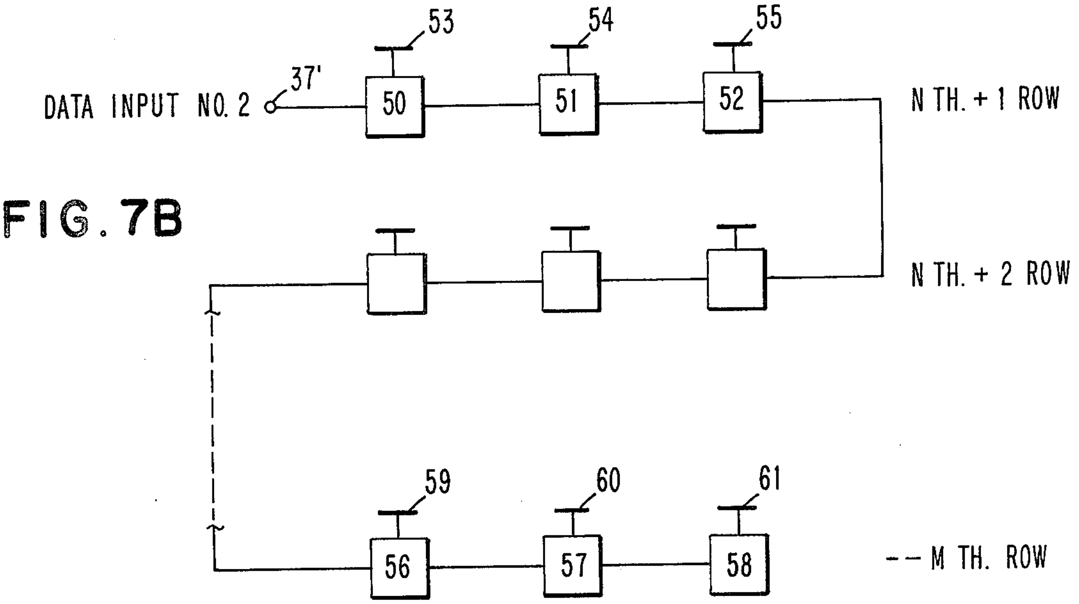

The control circuitry for activating the respective electrodes of the display may take the form of a matrix addressed memory, or a series of serial shift registers, the latter being preferable as the number of control leads to the semiconductor substrate is appreciably reduced. FIGS. 7A and 7B illustrate a serial shift register system for controlling the selective application of charge to the respective electrodes. Applied to an input terminal 37 (FIG. 7A) are data pulses, which are shifted serially through shift register stages 38, 39 and 40 and which are operative with the first row of electrodes in the display. Charge is applied to electrodes 41, 42 and 43 in accordance with the state of shift register stages 38, 39 and 40, respectively. Data from stage 40 is shifted serially through the respective stages of the following rows to the Nth row which includes shift register stages 44, 45 and 46, which in turn control the application of charge to electrodes 47, 48 and 49, respectively. If the display includes a large number of electrodes it may be desirable to have a second data input applied to an input terminal 37' (FIG. 7B) which applies data serially to the Nth + 1 row which includes shift register stages 50, 51 and 52 which selectively apply charge to electrodes 53, 54 and 55, respectively, with the output of stage 52 being shifted serially to the following rows and finally to the Mth row, where $M > N$, which includes shift register stages 56, 57 and 58 which selectively apply charge to electrodes 59, 60 and 61, respectively. Since data is shifted in serially, rather than in parallel to each row the number of data input leads is reduced accordingly.

A typical shift register stage is illustrated generally at 62 in FIG. 8. A shift register cell 63 has input data applied to an input terminal 64, with the data being shifted to the following stages by application of a clock pulse to an input terminal 65 with the data being shifted out to an output terminal 66. The shift register stage includes N channel MOSFETS 67, 68 and 69 which are connected in cascode. The common drain-source connection 70 of FET's 68 and 69 is connected to an electrode 71 which controls whether or not the membrane thereabove is deformed in accordance with whether or not charge is applied to the electrode. A typical operational sequence may be seen in relation to FIGS. 9A–9D. Data input as illustrated in FIG. 9A is applied to the data input terminal 64 and in turn to the shift register cell 63, and is shifted in a serial fashion to the output terminal 66 as well as being applied to the gate terminal 72 of the FET 68. The serial shifting of the data is under control of clock pulses as illustrated in FIG. 9B which are applied to the input terminal 65 for application to the clock terminal 73 of shift register cell 63 as well as to terminal 74 for application to successive stages of the shift register. After all of the input data has been stored in the shift register, a reset pulse as illustrated in FIG. 9C is applied to terminal 75 and in turn to gate electrode 76 of FET 69 and to terminal 77 for application to the remaining stages of the shift register. In response to the application of the rest pulse to the gate 76, FET 69 becomes conductive applying ground potential to the electrode 71, and in absence of charge on the electrode 71 the portion of the membrane thereabove becomes undeformed. Next, as illustrated in FIG. 9D a strobe pulse is applied to an input terminal 78 for application to the gate electrode 79 of the FET 67 and to a terminal 80 for application to the succeeding stages of the shift register. In response to the application of the strobe pulse to the gate electrode 79, FET 67 becomes conductive applying potential +V to the common drain-source connection 81 of FET 67 and 68. In the absence of a data pulse being applied to the gate electrode 72 of FET 68, FET 68 remains non-conductive and accordingly no charge is applied to the electrode 71. If, on the other hand, a data input pulse is applied to the gate electrode 72, the FET 68 becomes conductive and a voltage of +V is applied to the electrode 71, with the resultant charge causing the deformation of the portion of the membrane thereabove. This display may be refused by applying additional reset pulses 82 and strobe pulses 83, as indicated in FIGS. 9C and 9D, respectively. As was previously stated, the shift register 62 and accompanying control connections may be formed on the semiconductor substrate utilizing known MOSFET and/or bipolar technology.

We claim:

1. In a deformographic display, the combination comprising:

a silicon substrate having a silicon oxide layer formed on one surface thereof to a predetermined thickness, with said silicon oxide layer having a plurality of holes formed therein;

a reflective and deformable metal membrane formed on the surface of said silicon oxide layer;

integrated control circuitry formed in said one surface of said silicon substrate;

a plurality of electrodes formed in said one surface of said silicon substrate directly under the holes in said silicon oxide layer, there being one such electrode per hole, with each electrode being connected to said control circuitry by leads formed on said one surface of said silicon substrate, with the portion of said membrane over a given hole being deformed to a predetermined depth into said given hole in response to the electrode thereunder being selectively energized by said integrated control circuitry;

first, second and third lenses;

a stop;

a screen; and a light source for projecting light to said first lens, with said first lens being a collimating lens for directing collimated light to the surface of said reflective and deformable metal membrane, with said membrane reflecting said light to said second lens, with said second lens focusing said light onto said stop, with the light bypassing said stop being focused on said screen, with said stop blocking the portion of said light which is reflected from the undeformed portions of the surface of said membrane, wherein each deformed portion of said membrane over a given hole in said silicon oxide layer reflects light resulting in a bright spot on the screen of intensity:

$$S = \frac{4S_o}{R^2}\int_o^R \frac{rdr}{R^2}(1-\cos\phi)$$

where:

$S_o$ = intensity on the screen with the stop removed;

$R$ = *radius of hole in the silicon layer;*

$$\phi = \frac{4\pi\, y(r)}{\lambda R};$$

$\lambda$ = the wavelength; and $y(r)$ = describes the circularly symmetric deformation of the membrane at a distance r from the center of the hole.

2. The combination claimed in claim 1, wherein said integrated control circuitry includes a plurality of shift register stages connected in series, there being one such shift register stage connected to each electrode, with the stage of a given shift register determining whether or not the electrode connected thereto is energized.

* * * * *